United States Patent [19]

Lukasiewicz et al.

[11] Patent Number: 5,042,944
[45] Date of Patent: Aug. 27, 1991

[54] AUTOMATIC STRESS ANALYZER

[75] Inventors: Stanislaw A. Lukasiewicz, Calgary, Canada; Jacek Stupnicki, Warsaw, Poland

[73] Assignee: S.A.L. Engineering and Software Ltd., Calgary, Canada

[21] Appl. No.: 393,245

[22] Filed: Aug. 14, 1989

[51] Int. Cl.⁵ .............................................. G01B 11/18
[52] U.S. Cl. ...................................... 356/33; 356/367
[58] Field of Search ..................... 356/33, 34, 35, 365, 356/367; 250/225

[56] References Cited

U.S. PATENT DOCUMENTS

| | | |
|---|---|---|
| 3,645,603 | 2/1972 | Smith . |
| 3,950,987 | 4/1976 | Slezinger et al. . |
| 4,123,158 | 10/1958 | Reytblatt . |
| 4,171,908 | 10/1979 | Robert et al. . |
| 4,207,000 | 6/1980 | Miller . |
| 4,474,466 | 10/1984 | McDonach et al. . |

FOREIGN PATENT DOCUMENTS

| | | | |
|---|---|---|---|
| 3704390 | 8/1988 | Fed. Rep. of Germany | 356/34 |
| 1138768 | 6/1957 | France | 356/33 |

OTHER PUBLICATIONS

Brochure entitled "Experimental Stress Analysis Technology" by Measurements Group, Inc., North Carolina, U.S.A., 1981.

Brochure entitled "Photostress" by Measurements Group, Inc., North Carolina, U.S.A., 1984.
"Real-Time Observation of In-Plane Displacements of Opaque Surfaces", Wadsworth et al, Optics and Laser Technology, Jun. 1973, pp. 119-123.

Primary Examiner—Davis L. Willis
Assistant Examiner—Matthew W. Koren
Attorney, Agent, or Firm—Anthony R. Lambert

[57] ABSTRACT

A method and apparatus for the automatic analysis of stress in a body. The device includes a measuring head and an apparatus for traversing the measuring head across a photosensitive material attached to the body. The measuring head measures the intensity of light reflected or dispersed from the photosensitive material. The reflected or dispersed light is emitted from and received by diodes in the measuring head. Electrical signals representative of the intensity of light traversing the photosensitive material in three directions are generated for each of a set of points on the photosensitive material. The electrical signals are analyzed by computer and converted to stress and strain data which may then be displayed on a plotter or monitor. The method includes traversing the measuring head across the photosensitive material, detecting the intensity of light dispersed or reflected from the photosensitive material in three directions, analyzing the electrical signals to produce stress and strain data for the photosensitive material at each point, and displaying the resulting stress and strain data.

19 Claims, 4 Drawing Sheets

AUTOMATIC STRESS ANALYZER

FIELD OF THE INVENTION

The invention relates to the analysis of stress in a body, and in particular to a method and apparatus including a polariscope, for the automatic analysis of stress in a body coated with a photosensitive material.

BACKGROUND OF THE INVENTION

The determination of the strain and stress distribution at the surface of a mechanical or civil engineering structure under static or dynamic conditions is important for the proper design and safe operation of the structure. At present, two types of strain measuring device are used. Firstly, strain gauges, or tensometers, measure surface strain through the deformation of a gauge or sensor. Secondly, manually operated photostress devices, also known as birefringent coating polariscopes, utilize a thin layer of photoelectrically sensitive material glued to the surface being measured.

The photosensitive material distorts with the distortion or strain of the surface. This changes the light transmitting properties of the photosensitive material and when viewed under incident monochromatic light transmitted once or twice through the photosensitive material, the material exhibits characteristic interference patterns. The interference pattern is composed of light and dark fringes. The distribution of the light and dark fringes in the interference pattern gives, after appropriate analysis, information about the strain and stress distribution on the surface of the structure. The stress distribution on the surface forms a generalized vector, or tensor.

Present photostress devices enable the viewing and sometimes also the measurement of the intensity of the interference pattern, but only give information about one dimension of the three dimensional stress tensor.

Both strain measuring methods are time consuming and are not easy to use. The measurements must be performed by highly qualified personnel, especially in the case of photostress analysis.

The first method requires the application of many strain gauges to estimate accurately the state of strain on the measured surface. This is onerous, time consuming and potentially inaccurate due to the sensitivity of the gauges to temperature changes.

The second method, using the birefringent coating polariscope, can be performed only under laboratory conditions and has the following additional disadvantages.

(1) It does not provide strain and stress values immediately.

(2) The measurements give only information about the state of strain at one point of the surface. At least two additional measurements are necessary to estimate the strain state of the measured object.

(3) The method requires further application of another procedure or numerical calculation to obtain the stress distribution in the structure.

(4) The method does not readily give measurements over time.

SUMMARY OF THE INVENTION

This invention provides an automatic stress analyzer, and a method of using the automatic stress analyzer, which automatically provides the three components of the strain or stress tensor in a body coated with a photosensitive material, and in one embodiment determines the fringe order. The invention also provides a new polariscope plug for use in the automatic stress analyzer to facilitate data acquisition.

In one embodiment, the invention provides a measuring head for an automatic stress analyzer for analyzing the strain and stress on the surface of a body, the measuring head comprising:

a housing;

first, second and third monochromatic light emitting means disposed in the housing to emit light having a first wavelength towards the surface along first, second and third independent axes respectively;

first, second and third light detector means disposed in the housing to receive light emitted from the first, second and third monochromatic light emitting means respectively, the light being reflected from the surface;

polarizing and phase-shifting means disposed in the housing to polarize and phase-shift the emitted and received light.

In a still further embodiment, the invention provides an automatic stress analyzer for the analysis of stress in a body coated with a photosensitive material, the analyzer comprising:

a measuring head having means for emitting light having a first wavelength towards the photosensitive material and for detecting light reflected or dispersed from the surface along each of three independent axes, the measuring head having means for converting the detected light into electrical signals;

traversing means connected to the measuring head for traversing the measuring head across the photosensitive material;

means electrically connected to the traversing means and the measuring head for controlling the location of the traversing means and for analyzing the electrical signals to produce data representative of the state of strain or stress of the photosensitive material; and means for displaying the strain or stress data in human readable form.

In a still further embodiment, the invention provides a method for the automatic analysis of stress in a body having a surface coated with a photosensitive material, the method comprising:

transmitting monochromatic light from a measuring head towards the photosensitive material, and receiving light reflected or dispersed from the photosensitive material, along each of three independent axes, the light being received by the measuring head;

traversing the measuring head across a defined area on the photosensitive material;

converting the received light into electrical signals;

controlling the location of the traversing means, and analyzing the electrical signals to produce data representative of the state of strain or stress of the photosensitive material; and displaying the resultant stress or strain values.

Further summary of the invention may be formed in the claims.

BRIEF DESCRIPTION OF THE DRAWINGS

In drawings showing embodiments of the invention by way of example.

DESCRIPTION OF THE PREFERRED EMBODIMENTS

Figure 1:
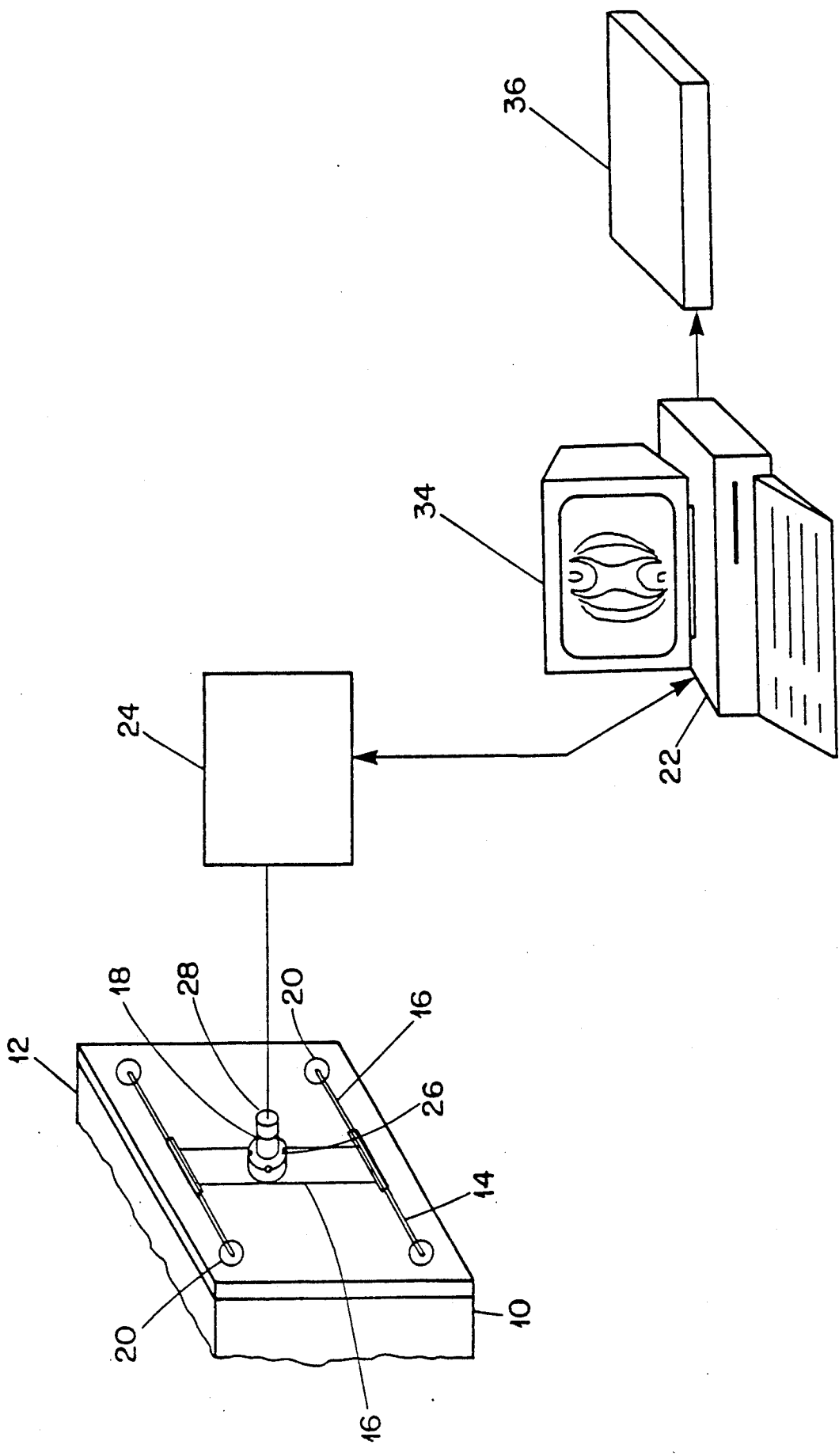
FIG. 1 is a schematic of components of an automatic stress analyzer according to the invention.

In FIG. 1 is shown a mechanical or engineering structure 10 which is the subject of examination. Glued to the structure is a photosensitive material 12, which may be obtained, for example, from the Photolastic Division of Measurements Group Inc., N.C. Attached to the photosensitive material is a traversing device 14 which may be obtained, for example, from the flatbed plotter made by Roland. The traversing device includes runners 16 which permit movement of the measuring head 18 in two perpendicular directions across the photosensitive material, which for the purposes of this application will be known as the X and Y directions. The traversing device 14 is attached to the photosensitive material 12 by pads 20 or other suitable means.

Measuring head 18 is moved on the traversing device 14 by servomotors (not shown) which operate under instruction from the computer 22, which may be, for example, an IBM-XT compatible available from any one of a number of manufacturers. Instructions from the computer 22 are relayed through the data acquisition board 24.

The measuring head 18 includes photosensitive diodes (not shown in FIG. 1) which receive light reflected from or dispersed from the backing of the photosensitive material 12 or the structure 10. In this patent, where the surface of the structure or body 10 is referred to, then it includes the backing of the photosensitive material 12 that is glued to the structure 10. Light is received along three independent axes. In this patent, where three axes are said to be independent then it will be understood that all three axes do not lie in the same plane and no two axes are colinear. The construction of the polariscope plugs used for emission and detection of light which traverses the photosensitive material 12 is discussed later in this patent.

The photosensitive diodes, which are readily commercially available, convert the light reflected or dispersed from the backing of the photosensitive material 12 into electrical signals. The electrical signals thus produced are amplified by an amplifier 26 located on the measuring head 18, and sequenced by multiplexer or flip-flop 28 in appropriate channels for analysis by the computer 22.

The data acquisition board 24 includes an analog to digital converter, address decoder and signal amplifiers The analog to digital converter which may be, for example, analog to digital card model number ADC 0809 made by Texas Instruments, converts the analog of the diodes to digital electrical signals suitable for the computer 22. The address decoder, for example, Standard 74 small and medium scale integrated TTL Circuits from Texas Instruments, ensures that the data received from the measuring head 12 is suitably addressed for the computer 22. The analog to digital converter, address decoder and signal amplifiers are well known in the art, and will not be discussed here.

The computer 22 processes the electrical signals received from the measuring head 18 (after conversion to digital form) and displays stress and strain data for the structure 10 on monitor 34 or plotter 36.

The measuring head 18 has at least three pairs of polariscope plugs for emitting and receiving light transmitted through the photosensitive material 12. The three pairs of plugs are oriented so as to be independent. These will now be described.

Figure 3:
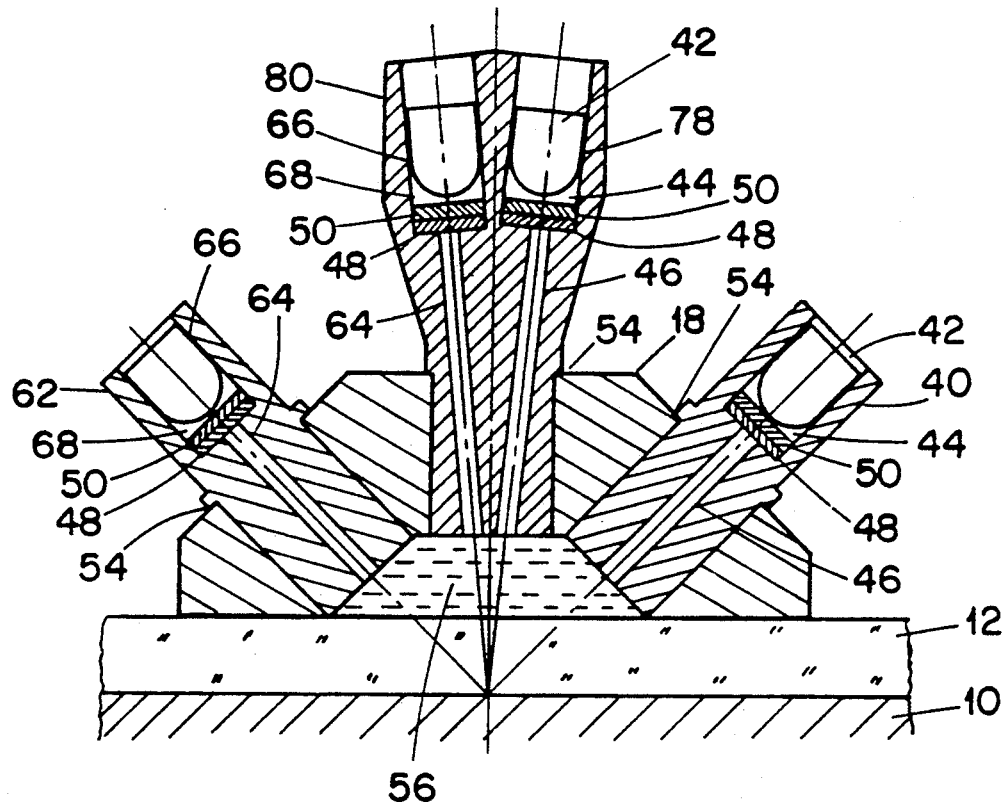
FIG. 3 is a cross-section along line 3—3 in FIG. 2.
Figure 2:
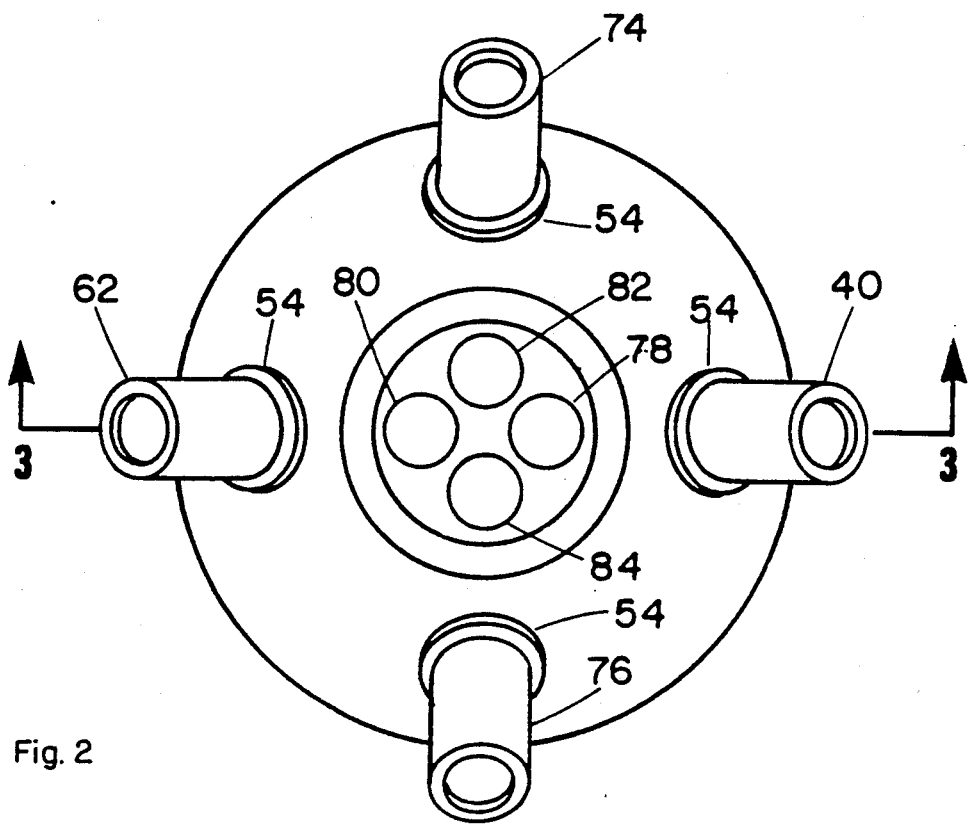
FIG. 2 is a top view of an embodiment of the measuring head of an automatic stress analyzer according to the invention.

In FIGS. 2 and 3 is shown a first version of the measuring head 18. The measuring head 18 rests on photosensitive material 12 which is glued to structure 10. Single diode polariscope plug 40 having axis 39 is oriented at 45 degrees to the normal to the plane of the photosensitive material 12. The polariscope plug 40 includes a high intensity transmitting diode 42, such as model number MT2000 ultra bright LED from Stanley. This particular transmitting diode 42 is a source of monochromatic red light. It is placed in a socket 44 in the housing at the end of polariscope plug 40. The transmitting diode 42 is oriented along the axis 39 of the polariscope plug 40. Channel 46 extends along the axis 39 of the polariscope plug 40. At the same end of the polariscope plug 40 and close to the transmitting diode 42, is a Polaroid plate 48 and quarter wave length plate 50. Polaroid plate 48 polarizes the emitted light and quarter wavelength plate 50 shifts the phase of the light wave.

Light from the polariscope plug 40 is transmitted from the transmitting diode 42 through the immersion liquid 56, through the photosensitive material 12, is reflected or dispersed from the backing of the photosensitive material 12 or the structure 10, and passes through the photosensitive material 12 again, through the immersion liquid 56 again, along axis 60 through channel 64 of polariscope plug 62, through polaroid plate 48 and quarter wave length plate 50 of polariscope plug 62, to receiving diode 66 seated in socket 68 of the polariscope plug 62. It is desirable to place the polaroid plate 48 and quarter wave length plate 50 near to the receiving diode 66 since the plates 48 and 50 disperse the incident light.

Receiving diode 66, which may be for example a phototransistor from Stanley, converts the light reflected or dispersed from the structure 10 or photosensitive material 12, into electrical signals. These are then passed into an amplifier 26 which amplifies the signals for transmission to the computer 22.

A second pair of single diode polariscope plugs 74 and 76, one a receiving plug such as polariscope plug 62 and one a transmitting plug such as polariscope plug 40, are oriented on the measuring head 18 substantially at right angles to the polariscope plugs 40 and 62. The polariscope plug 76 is placed diametrically opposite polariscope plug 74 on the measuring head 18, in the same manner as polariscope plugs 42 and 62.

A third pair of polariscope plugs 78 and 80, one a transmitting plug such as polariscope plug 40 and one a receiving plug such as polariscope plug 62, are joined together as a single plug about axis 75 and located at an angle of substantially 45 degrees to the other polariscope plugs 40, 62, 74 and 76, and very close to the normal of the plane of the photosensitive material 12.

A fourth pair of polariscope plugs 82 and 84, one being a transmitting plug, and the other being a receiving plug, are also joined together as a single plug and disposed in the measuring head 18 closely adjacent the normal to the plane of the photosensitive material 12. Each of the transmitting diodes for the polariscope plugs in the first, second and fourth pairs of polariscope plugs emit the same monochromatic light, such as, preferably, red light. The transmitting diode 42 in the polariscope plug 78 emits a different wave length of light, such as green light. Receiving diode 66 in polariscope plug 78 receives the green light. The use of two different wave lengths of light along the same axis permits the determination of the fringe order of the fringes in the interference pattern produced by the photosensitive material 12.

For each of polariscope plugs 78, 80, 82 and 84, the same means for polarizing and phase shifting the emitted and received light is used, namely Polaroid plate 48 and quarter wave plate 50.

In FIGS. 2 and 3, equivalent parts in the polariscope plugs are identified by the same number. Electrical connections to the amplifier 26 for the measuring head 18 are not shown. Apart from the use of a different wavelength of light in one pair of polariscope plugs and the placing of vertical plugs close to each other, each of the transmitting plugs and each of the receiving plugs have identical internal construction as described for polariscope plugs 40 and 62.

The quarter wave plate 50 used in the polariscope plug 78 may be for red light. The error caused by using the wrong ¼ wavelength plate (diode 42 in polariscope plug 78 emits green light) is not significant for the determination of fringe order, so long as the wavelengths, such as for green and red light, are sufficiently close to each other. For calculating stress values, however, it is desirable that the correct ¼ wavelength plate be used.

The angle of the first and second pairs of polariscope plugs to the third and fourth pairs of polariscope plugs is variable, but is preferably about 45 degrees. Too small an angle tends to magnify errors since the analysis of the state of stress in the photosensitive material 12 depends on the difference between the intensity of the light received by the fourth pair of the polariscope plugs and the intensity of the light received by the first and second pairs of polariscope plugs. In effect, when the angle is too small, the axes become essentially co-linear. If the angle is too great, then the light transmitted from the transmitting diode 42 will not be transmitted properly through the photosensitive material 12.

A second version 38 of the measuring head 18 will now be described with reference to FIGS. 4 and 5. Equivalent parts in FIGS. 4 and 5 to those shown in FIGS. 2 and 3 have been given the same numerical designation. While the measuring head 18 shown in FIGS. 2 and 3 depends primarily on the reception of reflected light from the rear surface of the photosensitive material 12 or the structure 10, the measuring head 38 depends primarily on light dispersed from the backing of the photosensitive material 12, or if there is no backing, then from the structure 10.

Figure 5:
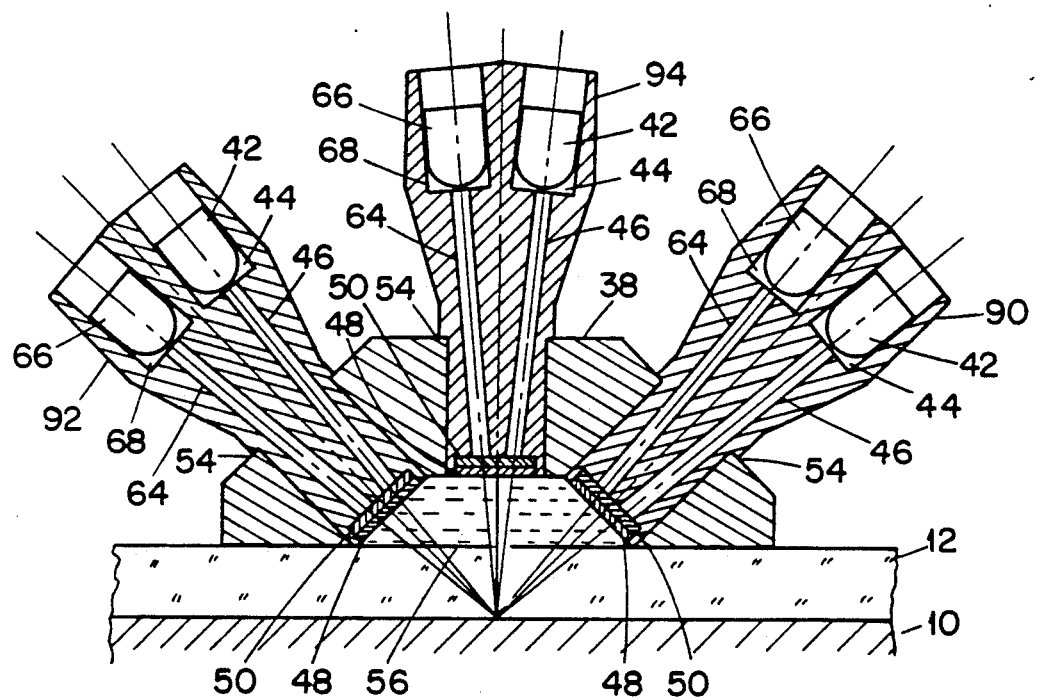
FIG. 5 is a cross-section along line 5—5 in FIG. 4.
Figure 4:
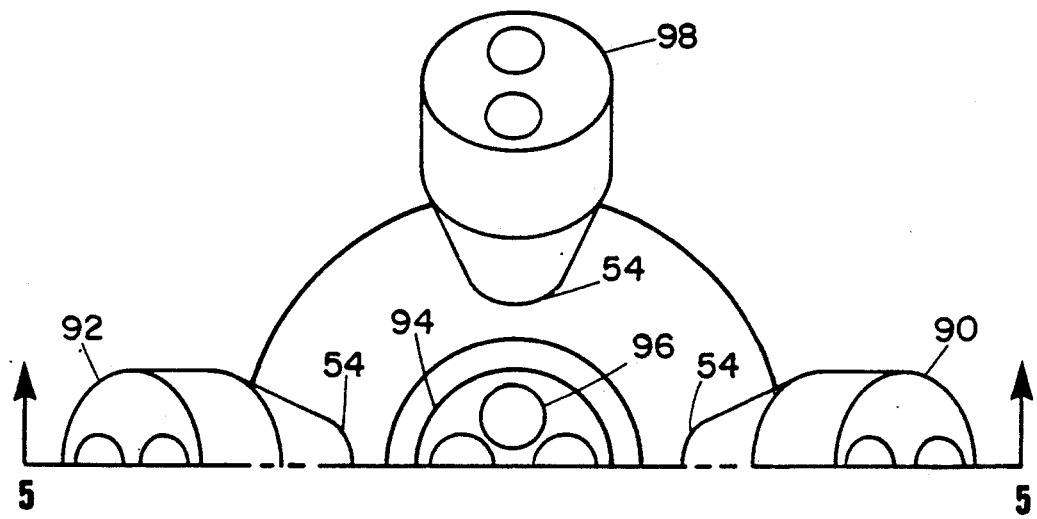
FIG. 4 is a top view of one side of a further embodiment of the measuring head of an automatic stress analyzer according to the invention.

In FIGS. 4 and 5 are shown parts of 5 pairs of polariscope plugs 90, 92, 94, 96 and 98. A sixth pair of polariscope plugs (not shown) is located opposite the fifth pair of polariscope plugs 98. Each pair of polariscope plugs 90, 92, 94, 96 and 98 includes a transmitting diode 42 in a socket 44, channel 46, polaroid plate 48, quarter wave plate 50, and receiving diode 66 in socket 68 each aligned substantially along axis 70 of the polariscope play housings. Light emitted from each of the transmitting diodes 42 passes through the channels 46, Polaroid plates 48, quarter wave plates 50, immersion liquid 56, photosensitive material 12, is dispersed from the backing of the photosensitive material 12, or the structure 10, passes back up through the photosensitive material 12, the immersion liquid 56, the polaroid plates 48, the quarter wave plates 50, and the channels 64 to the receiving diodes 66. The receiving diodes 66 convert the light into electrical signals, which vary in strength with the intensity of the light, which is then passed through electrical conductors (not shown) to amplifier 26 for amplification before transmission to the computer 22.

The first, third and fifth pairs of polariscope plugs 90, 94 and 98 each transmit and receive monochromatic light, such as red light. The other pairs of polariscope plugs 92, 96 and one not shown, transmit and receive a different colour of light, for example green light. From this, the fringe order of the interference pattern may be determined, as discussed below The first and fifth pairs of polariscope plugs 90 and 98 are at about 45 degrees to the third pair of polariscope plugs 94 and substantially at right angles to each other. The second and sixth pairs of polariscope plugs 92 and the other not shown are also substantially at right angles to each other and at about 45 degrees to the fourth pair of polariscope plugs 96. The same principles apply for the orientation of the polariscope plugs of measuring head 38 in relation to each other as for measuring head 18.

Each of the polariscope plugs slidably fits in the measuring head 18, and shoulders 54 abut the measuring head 18 to prevent further slippage. The polariscope plugs may be glued in place, and they and the measuring head 18 may be made of any suitable material such as aluminum.

Figure 6:
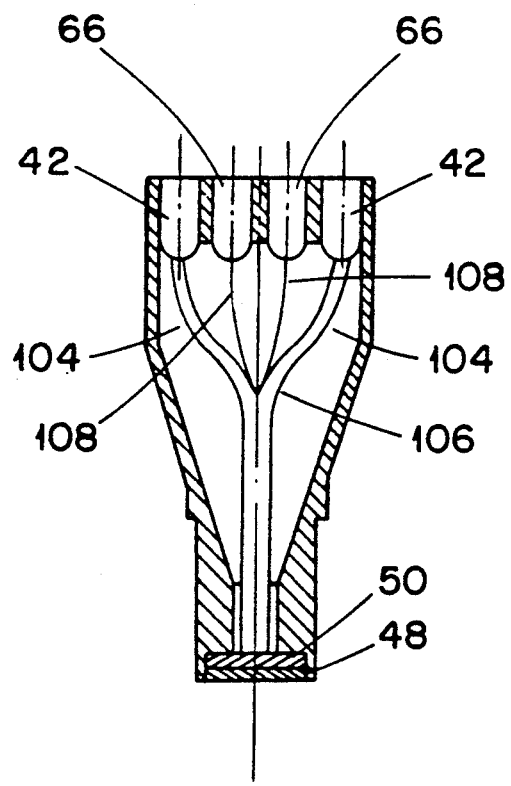
FIG. 6 is an embodiment of a polariscope plug for a measuring head according to the invention.

A different version of a four-diode polariscope plug 100 having an axis 102 is shown in FIG. 6. Transmitting diodes 42 emit light into the glass fibers 104 which merge at 106. The light is transmitted through the glass fiber 106, through Polaroid plate 48 and quarter wave length plate 50, and reflected or dispersed light from the photosensitive material, not shown, passes back through the quarter wave plate 50 and polaroid plate 48, through glass fiber 106 to glass fibers 108 and then to receiving diodes 66.

One of the transmitting diodes 42 emits one colour of light, for example, red, and the other a different colour, for example, green light. The receiving diodes 66 should be appropriately chosen for the colour of light. This plug may be used in place of the pairs of polariscope plugs 94 and 96 or polariscope plugs 78, 80, 82 and 84.

For each of the polariscope plugs in which the receiving and transmitting diodes lie along substantially the same axis, it is desirable that the diodes be as close to the axis as possible, so that the directions of the light beams are close to their respective axes.

The manner of operation of the automatic stress analyzer is as follows. Analysis is initiated from the computer 22. Upon initiation, the computer asks for the definition of the boundaries of the area to be analyzed. A mouse may be used for this purpose. The computer 22 then sends electrical signals through the data acquisition board 24 to the servomotors, not shown, on the traversing device 14 which move the measuring head 18 across the surface of the photosensitive material 12. The computer 22 thus controls the traverse of the measuring head 18 utilizing the servomotors.

Under instructions from the computer 22, through the data acquisition board 24, each of the transmitting diodes 42 in the measuring head 18 is provided sequentially with electric pulses which cause it to emit light. Various scheduling of the diodes may be used, but single pulses sequentially in turn sent to each transmitting diode 42 has been found preferable.

Upon reflection or dispersion from the backing of the photosensitive material 12 or the structure 10, the reflected or dispersed light is received by the appropriate receiving diode 66. The receiving diode 66 will be on the opposite side of the measuring head 18 from the transmitting diode 42 only for the polariscope plugs 40, 62, 74 and 76 (those at a 45 degree angle to the normal of the plane of the photosensitive material in FIGS. 2 and 3). Otherwise, the receiving diodes 66 and transmitting diodes 42 for each polariscope plug in FIGS. 2, 3, 4 and 5 will be adjacent to each other on the measuring head.

Each receiving diode 66 is sampled sequentially in the order that the appropriate transmitting diode 42 is pulsed. The electrical signals from the receiving diodes 66 are then amplified and multiplexed in accordance with the requirements of the data acquisition board 24 and computer 22, and converted to digital electrical signals for analysis by the microprocessor of computer 22.

On arrival at the computer 22, the digital electrical signals are stored in a two dimensional array whose entries relate to the X-Y coordinates on the photosensitive material, within the boundaries defined during the initiation process. The points within the boundaries so defined are also stored.

The strain and stress tensors for the photosensitive material 12, and consequently the structure 10, may then be determined by the following process carried out by the computer 22.

Firstly, the digital electrical signals which correspond to the intensity of light received by the receiving diodes 66 are converted to fringe values according to the following equation:

$$N = 2 \arcsin [\sqrt{I}] \quad (1)$$

Where N is the fringe value and i is the relative intensity of light received defined by: $I = I_a/I_{max}$, where $I_a$ is the actual light intensity and $I_{max}$ is the maximum light intensity.

The fringe values N, which will be known as a function of X and Y for the area on the photosensitive material 12 within the boundary defined in the initiation process, may then be digitally filtered to remove noise in known fashion. A fast Fourier transform may be used for this purpose.

The principle strains, $e_x$ and $e_y$, may then be determined from the following equations:

$$e_x = (2/3)^{1/2}(c/2t(1 + v) [(2N_x^2 + N_y^2 - 3N_n^2)^{1/2} - \quad (2)$$

$$(N_x^2 + 2N_y^2 - 3N_n^2)^{1/2}]$$

$$e_y = (2/3)^{1/2}(c/2t(1 + v) [(2N_y^2 + N_x^2 - 3N_n^2)^{1/2} - \quad (3)$$

$$(N_y^2 + 2N_x^2 - 3N_n^2)^{1/2}]$$

In these equations, t is the thickness of the photosensitive material, is Poisson's ratio and c is a constant for each material which is determined by the manufacturer, or which may be determined experimentally by known methods. $N_x$ is the fringe value calculated from the light intensities along the x direction, $N_y$ is the fringe value calculated from the light intensity along the y direction, and $N_n$ is the fringe value calculated from the light intensity along the normal to the plane of the photosensitive material. As will be seen from these equations it is necessary that the angles between the axes of the polariscope plugs be sufficiently great that the differences between $N_x$, $N_y$ and $N_n$ are not primarily noise.

These equations are derived from known equations in the art, with the condition that the angle between the x and y axes is close to 90 degrees and the angles between the normal and the x and y axes are each close to 45 degrees. The computations are carried out by the microprocessor of the computer 22.

The fringe order may be determined by looking at the fringe values along a certain direction for light of one colour and comparing it to the fringe values for light of another colour. Since the fringes for light of different colours will be offset in a known manner in relation to the fringe order, once the offset between fringes is known, the fringe order may be determined. Absolute fringe order may be determined from the boundary conditions which are specified during the initiation of the process. The specifications of the boundaries, for example free boundaries, will define the first fringes. Knowing the sequence of fringes, for light of different colours, will therefore determine the absolute fringe order. The computer 22 may be readily programmed to calculate the fringe order in this manner.

Once the strain tensor has been calculated as shown above, the stress tensor may be derived in known manner.

Use of the measuring head 38 enables determination of the strain tensor by using two different wavelengths of light. In this manner, more accurate results may be obtained.

It will be understood that various modifications to the above described method and apparatus may be made by a person skilled in the art which are not substantially different from the invention described here. All such equivalent modifications are intended to be covered by the scope of the claims which follow.

We claim:
1. A plug for a polariscope comprising:
   a housing having an axis and having a first end and a second end;
   first and second monochromatic light emitting means disposed in the housing at the first end for emitting light substantially along the axis towards the second end;
   first and second light detector means disposed in the housing at the first end for respectively receiving light emitted from the first and second monochromatic light emitting means and reflected from or dispersed from an external object into the housing substantially along the axis; and
   polarizing and phase-shifting means disposed in the housing on the axis for polarizing and phase-shifting the emitted and reflected or dispersed light.
2. The plug of claim 1 further comprising optical fibres through which the emitted and reflected or dispersed light passes between the first and second ends.
3. A measuring head for an automatic stress analyzer for analyzing the strain and stress on the surface of a body coated with a photosensitive material, the measuring head comprising:
   a housing;
   first, second and third monochromatic light emitting means disposed in the housing to emit light having a first wavelength towards the surface along first, second and third independent axes respectively;

first, second and third light detector means disposed in the housing to receive light emitted from the first, second and third monochromatic light emitting means respectively, the light being reflected from the surface;

polarizing and phase-shifting means disposed in the housing to polarize and phase-shift the emitted and received light.

4. The measuring head of claim 3 further including a fourth monochromatic light emitting means disposed in the housing adjacent one of the first, second or third monochromatic light emitting means for emitting light having a second wavelength substantially along the axis of the one of the first, second or third monochromatic light emitting means, and a fourth light detecting means disposed in the housing to receive light emitted from the fourth monochromatic light emitting means, the light having been reflected from the surface.

5. The measuring head of claim 4 in which the first axis is at about an angle of 45 degrees to each of the second and third axes, and the second and third axes are substantially perpendicular to each other.

6. The measuring head of claim 3 in which the first axis is at about an angle of 45 degrees to each of the second and third axes, and the second and third axes are substantially perpendicular to each other.

7. A measuring head for an automatic stress analyzer for analyzing the strain and stress on the surface of a body coated with a photosensitive material, the measuring head comprising:

a housing;

first, second and third monochromatic light emitting means disposed in the housing to emit light having a first wavelength towards the surface along first, second and third independent axes respectively;

first, second and third light detector means disposed in the housing to receive light emitted from the first, second and third monochromatic light emitting means respectively, the light being dispersed from the surface;

polarizing and phase-shifting means disposed in the housing to polarize and phase-shift the emitted and received light.

8. The measuring head of claim 7 in which each monochromatic light emitting means is disposed in the housing adjacent its respective light detector means.

9. The measuring head of claim 8 further including a fourth monochromatic light emitting means disposed in the housing adjacent one of the first, second and third monochromatic light emitting means for emitting light having a second wavelength along the axis of the one of the first, second and third monochromatic light emitting means, and a fourth light detector means disposed in the housing to receive light emitted from the fourth monochromatic light emitting means and dispersed from the surface.

10. The measuring head of claim 9 further including a fifth monochromatic light emitting means disposed in the housing for emitting light substantially along a difference axis from the one of the first, second and third monochromatic light emitting means, a fifth light detector means disposed in the housing adjacent the fifth monochromatic light emitting means to receive light emitted from the fifth monochromatic light emitting means, the light being dispersed from the surface, and a sixth monochromatic light emitting means disposed in the housing for emitting light substantially along a different axis from the one of the first, second and third monochromatic light emitting means and a sixth light detector means disposed in the housing to receive light emitted from the sixth monochromatic light emitting means and dispersed from the surface, the fifth and sixth monochromatic light emitting means emitting light of the same colour as the fourth monochromatic light emitting means.

11. An automatic stress analyzer for the analysis of stress on the surface of a body coated with a photosensitive material, the analyzer comprising:

a measuring head having means for emitting light having a first wavelength towards the photosensitive material and for detecting light reflected or dispersed from the surface along each of three independent axes, and converting the detected light into electrical signals;

traversing means connected to the measuring head for traversing the measuring head across the photosensitive material;

means electrically connected to the traversing means and the measuring head for controlling the location of the traversing means and analyzing the electrical signals to produce data representative of the state of strain or stress of the photosensitive material; and means for displaying the strain or stress data in human readable form.

12. The automatic stress analyzer of claim 11 in which the means for analyzing includes an analog to digital converter responsive to the electrical signals and having digital output; and logic means responsive to the digital output for converting the digital output to stress data output readable by the display means.

13. The automatic stress analyzer of claim 12 in which the measuring head comprises:

a housing;

first, second and third monochromatic light emitting means disposed in the housing to emit light towards the surface along first, second and third independent axes respectively;

first, second and third light detector means disposed in the housing to receive light emitted from the first, second and third monochromatic light emitting means respectively, the light being reflected from the surface;

polarizing and phase-shifting means disposed in the housing to polarize and phase-shift the emitted and received light.

14. The automatic stress analyzer of claim 11 in which the measuring head comprises:

a housing;

first, second and third monochromatic light emitting means disposed in the housing to emit light having a first wavelength towards the surface along first, second and third independent axes respectively;

first, second and third light detector means disposed in the housing to receive light emitted from the first, second and third monochromatic light emitting means respectively, the light being reflected from the surface;

polarizing and phase-shifting means disposed in the housing for polarizing and phase-shifting the emitted and received light.

15. The automatic stress analyzer of claim 11 further including a fourth monochromatic light emitting means disposed in the housing adjacent one of the first, second or third monochromatic light emitting means for emitting light heaving a second wavelength along the axis of the one of the first, second or third monochromatic light emitting means, and a fourth light detecting means disposed in the housing to receive light emitted from the fourth monochromatic light emitting means, the light having been reflected from the surface.

16. The automatic stress analyzer of claim 11 in which the measuring head includes:

a housing;

first, second and third monochromatic light emitting means disposed in the housing to emit light having a first wavelength towards the surface along first, second and third independent axes respectively;

first, second and third light detector means disposed in the housing to receive light emitted from the first, second and third monochromatic light emitting means respectively, the light being dispersed from the surface;

polarizing and phase-shifting means disposed in the housing to polarize and phase-shift the emitted and received light.

17. The automatic stress analyzer of claim 16 in which each monochromatic light emitting means is disposed in the housing adjacent its respective light detector means, and further including a fourth monochromatic light emitting means disposed in the housing adjacent one of the first, second and third monochromatic light emitting means for emitting light having a second wavelength along the axis of the one of the first, second and third monochromatic light emitting means, and a fourth light detector means disposed in the housing to receive light emitted from the fourth monochromatic light emitting means and dispersed from the surface.

18. A method for the automatic analysis of stress on the surface of a body coated with a photosensitive material, the method comprising:

transmitting monochromatic light from a measuring head towards the photosensitive material, and receiving light reflected or dispersed from the photosensitive material, along each of three independent axes, the light being received by the measuring head;

traversing the measuring head across a defined area on the photosensitive material;

converting the received light into electrical signals;

controlling the location of the traversing means, and analyzing the electrical signals to produce data representative of the state of strain or stress of the photosensitive material; and displaying the resultant stress or strain values.

19. The method of claim 18 further including transmitting and receiving light of a different wave length along one of the three axes, converting the received light into electrical signals, and comparing the electrical signals received along the one of the axes for the two different wave lengths of light to determine the fringe order of the interference pattern produced by the photosensitive material.

* * * * *